United States Patent
Wu et al.

(10) Patent No.: US 8,378,636 B2
(45) Date of Patent: Feb. 19, 2013

(54) MULTI-CELL PROTECTION CIRCUIT AND METHOD

(75) Inventors: Zhengdong Wu, Shenzhen (CN); Jun Zhou, Shenzhen (CN); Qinyao Yang, Shenzhen (CN)

(73) Assignee: BYD Company Ltd., Shenzhen (CN)

( * ) Notice: Subject to any disclaimer, the term of this patent is extended or adjusted under 35 U.S.C. 154(b) by 349 days.

(21) Appl. No.: 12/670,393

(22) PCT Filed: Sep. 27, 2008

(86) PCT No.: PCT/CN2008/072560
§ 371 (c)(1),
(2), (4) Date: Jan. 22, 2010

(87) PCT Pub. No.: WO2009/043302
PCT Pub. Date: Apr. 9, 2009

(65) Prior Publication Data
US 2010/0207582 A1    Aug. 19, 2010

(30) Foreign Application Priority Data

Sep. 27, 2007 (CN) .......................... 2007 1 0123761

(51) Int. Cl.
*H02J 7/00* (2006.01)
*G01N 27/416* (2006.01)
(52) U.S. Cl. ........ 320/134; 320/107; 320/116; 320/128; 324/426
(58) Field of Classification Search .................. 320/134
See application file for complete search history.

(56) References Cited

U.S. PATENT DOCUMENTS

| | | | | |
|---|---|---|---|---|
| 5,789,900 A | * | 8/1998 | Hasegawa et al. | 320/132 |
| 5,998,969 A | * | 12/1999 | Tsuji et al. | 320/132 |
| 6,340,889 B1 | * | 1/2002 | Sakurai | 324/433 |
| 6,373,225 B1 | * | 4/2002 | Haraguchi et al. | 320/122 |
| 7,495,418 B2 | * | 2/2009 | Yano et al. | 320/166 |

(Continued)

FOREIGN PATENT DOCUMENTS
CN    2796215 Y    7/2006
JP    2003111284 A    4/2003

OTHER PUBLICATIONS

International Search Report issued in PCT/CN2008/072560, Jan. 8, 2009, 16 pages by ISA/CN, 3 pages.

*Primary Examiner* — Drew A Dunn
*Assistant Examiner* — Nathaniel Pelton
(74) *Attorney, Agent, or Firm* — Morgan, Lewis & Bockius LLP

(57) ABSTRACT

A multi-cell protection circuit and method. The multi-cell protection circuit comprises one or more multi-cell protection chips, a charge control switch (M2) and a discharge control switch (M1). Each multi-cell protection chip comprises a multi-cell protection integrated circuit module and an expansion connection module. The input terminals (VC1, VC2, VC3, GND1, VC4, VC5, VC6, VC7, GND) of the multi-cell protection integrated circuit module are connected to the positive and negative poles of corresponding cells. The output terminals (co, do) of the multi-cell protection integrated circuit module are connected to the interior signal input terminals (Dco, Ddo) of the expansion connection module. The expansion signal input terminals (exterior.co, exterior.do) of the expansion connection module are connected to expansion signal output terminals (Co', Do') of an expansion connection module in a multi-cell protection chip adjacent to this multi-cell protection chip. The output terminals (Co', Do') of the expansion connection module in the last multi-cell protection chip among the multi-cell protection chips connected in the multi-cell protection circuit are connected to the charge control switch and the discharge control switch, respectively.

11 Claims, 10 Drawing Sheets

U.S. PATENT DOCUMENTS

| | | |
|---|---|---|
| 7,800,342 B2 * | 9/2010 | Kobayashi et al. ............ 320/118 |
| 2003/0044689 A1 * | 3/2003 | Miyazaki et al. ............. 429/320 |
| 2005/0231173 A1 * | 10/2005 | Yano et al. .................... 320/166 |
| 2006/0103349 A1 * | 5/2006 | Yamamoto .................... 320/116 |
| 2007/0176493 A1 * | 8/2007 | Koski et al. ..................... 307/11 |

* cited by examiner

MULTI-CELL PROTECTION CIRCUIT AND METHOD

CROSS REFERENCE TO RELATED APPLICATIONS

This Application is a United States National Stage Application filed under 35 U.S.C. §371 of PCT Patent Application Serial No. PCT/CN2008/072560 filed on Sep. 27, 2008 which claims benefit of and priority to Chinese Patent Application Serial No. 200710123761.6 filed Sep. 27, 2007, the disclosures of all of which are hereby incorporated by reference in their entirety.

FIELD OF THE INVENTION

The present invention pertains to cell protection field, in particular to a multi-cell protection circuit and method.

BACKGROUND OF THE INVENTION

A cell will be over-charged if the charging voltage on the cell exceeds the upper limit of charging voltage when the cell is charged; a cell will over-discharge if the discharging voltage of the cell is lower than the lower limit of discharging voltage when the cell discharges. For example, for a Li-ion cell, if the Li-ion cell is over-charged, the pressure in the cell will increase, the cell will be deformed, electrolyte leakage may occur, and the cell may even explode or burst into flame; if the Li-ion cell over-discharges, the pressure in the cell will increase, the electrolyte will decompose and thereby the core capacity and durability will be degraded; as a result, the serving time of the Li-ion battery will become shorter and shorter. For other cells, such as ferric-ion cells, over-charge or over-discharge will also deteriorate the characteristics of the cell and shorten the service life of the cell. A cell protection circuit is designed to prevent over-charge or over-discharge and thereby protect the cell against deterioration. As electronic devices develop towards the trend of miniaturization, integrated circuits specially designed to protect cells emerge as the times require. At present, one integrated circuit for cell protection can only protect up to 4 cells connected serially. In applications where more than 4 cells are connected serially, a plurality of integrated circuits for cell protection can be connected through a complex peripheral circuit to implement protection of cell. However, the drawbacks of such an approach include: high cost; complex peripheral circuit; poor expandability and testability in actual applications; excessive exterior components, large footprint, and adverse effect to system integration; uneven power consumption among the cells connected serially, etc.

FIG. 1 shows a typical circuit connection for protection of a battery composed of seven cells connected serially, which is implemented by connecting seven individual integrated circuits for cell protection through a peripheral circuit.

The working principle of an integrated circuit for protection of cells is as follows: the terminal Co of the integrated circuit for protection of cells is a grid connection terminal of a NMOSFET for controlling charge, while the terminal Do is a grid connection terminal of a NMOSFET for controlling discharge. In normal state, both the terminal Do and the terminal Co are at high level, the exterior NMOSFETs for controlling charge and discharge are in ON state, and cells are in chargeable and dischargeable state. When the charging voltage on the cells reaches the upper limit for the cells, the output level at the terminal Co will change from high level to low level after some time delay, and thereby switch off the exterior NMOSFET for charging, i.e., switch off the charging circuit; when the discharging voltage of the cells reduces to the lower limit for the cell, the output level at the terminal Do will change from high level to low level after some time delay, and thereby switch off the exterior NMOSFET for discharging, i.e., switch off the discharge circuit.

Through the peripheral circuit connection, over-charge and over-discharge of the cells will be treated separately, to implement cell protection against over-charge and over-discharge, as follows:

In normal state, both the terminal Co and the terminal Do of each integrated circuit for cell protection are at high level, the NMOSFETs V5, V6, and V7 for controlling discharge and the NMOSFET V8 for controlling charge are in ON state, and the entire battery is in chargeable and dischargeable state.

When discharging, if any integrated circuit for cell protection detects over-discharge of a cell, the terminal Do of the integrated circuit will change to low level after some time delay, and thereby switch the exterior PMOSFET V2(V2A, V2B . . . or V2G) to ON state, transmit a high level potential related to ground to NMOSFET V4 to switch on V4, and transmit a ground potential to the NMOSFETs V5, V6, and V7 in the exterior circuits connected in parallel for discharge control and thereby switch them from ON state to OFF state to switch off the discharge circuit and achieve protection against over-discharge.

When charging, if any integrated circuit for cell protection detects over-charge of a cell, the terminal Co of the integrated circuit will change to low level after some time delay, and thereby switch the exterior PMOSFET V1(V1A, V1B . . . or V1G) to ON state, transmit a high level potential related to the negative terminal of the charger to NMOSFET V3 to switch on V3, and transmit a potential at negative terminal of the charger to the NMOSFET V8 in the exterior circuit for discharge control to switch it from ON state to OFF state and thereby switch off the charge circuit and achieve protection against over-charge.

In functionality, the circuit described above has attained the object of protection for seven cells connected serially. However, it has the following drawbacks: the peripheral circuit is complex; a large number of components are used; a two-stage treatment approach is employed for level shifting, and therefore increases circuit cost and difficulties in testing; the separation between charge circuit and discharge circuit increases complexity in application; after over-charge protection or over-discharge protection is activated, the power consumption of the circuit is higher than the power consumption of the in normal state, due to the existence of the peripheral circuit; especially, the MOSFETs in the peripheral circuit must be components endurable to high voltage; therefore, in applications where more cells are connected, the circuit will be more complex, in consideration of voltage endurance of the components.

SUMMARY OF THE INVENTION

The object of the present invention is to provide a multi-cell protection circuit, in order to solve the problems of protection circuits for more than 4 cells in the prior art, such as high cost, complex peripheral circuit, a large number of exterior components, adverse effects to system integration, and poor expandability and testability, etc.

The technical solution of the present invention is implemented as follows: a multi-cell protection circuit, which comprises one or more multi-cell protection chips, a charge control switch and a discharge control switch, wherein each multi-cell protection chip comprises a serially connected multi-cell battery protection integrated circuit module and an expansion connection module; the input terminals of the serially connected multi-cell battery protection integrated circuit module are used to connect to the positive and negative poles of corresponding cells, and the output terminals are connected to the interior signal input terminals of the expansion connection module; the expansion signal input terminals of the expansion connection module are connected to expansion signal output terminals of an expansion connection module in a multi-cell protection chip adjacent to this multi-cell protection chip, thereby the multi-cell protection chips connect together, and the expansion signal output terminals of the expansion connection module in the last connected multi-cell protection chip among the connected multi-cell protection chips are connected to the charge control switch and the discharge control switch, respectively.

Another object of the present invention is to provide a method for protecting a multi-cell battery, which comprises the following steps:

each multi-cell protection chip generating interior input signals that indicate the cell state, according to the state of the cell monitored by the protection chip;

each multi-cell protection chip carrying out logical decision one by one according to the interior input signals, an expansion selection control signal, and expansion output signals that indicate the expansion output state of a multi-cell protection chip adjacent to this multi-cell protection chip; and controlling ON/OFF state of the cell charge/discharge circuit, according to the logical decision of the last multi-cell protection chip.

The technical solution provided in the present invention implements expansion of the multi-cell protect chips by providing an expansion connection module for the serially connected multi-cell battery protection integrated circuit module in each multi-cell protection chip. Each multi-cell protection chip only carries out logical operation for the interior input signals indicated the state of the cells monitored by it and the expansion output signal indicated expansion output state of the multi-cell protection chip adjacent to it to determine whether over-charge or over-discharge occurs, the logical operation is carried out stage by stage, beginning with the first multi-cell protection chip, finally, the ON/OFF state of the cell charge/discharge circuit is controlled according to the logical operation result of the last multi-cell protection chip. In that way, the protection of any cell against over-charge and over-discharge is implemented. In addition, the cell protection circuit can reduce cost and increase system reliability; since the cell protection circuit doesn't need any peripheral device, the cost of peripheral circuit is reduced, and the problems related to testability and expandability resulted from complex layout of peripheral circuit are avoided; since each cell protection chip only carries out logical processing for the voltage state of the cell monitored by it and the voltage state monitored by the adjacent cell protection chip, the potential range involved in the treatment is reduced, and therefore the problem related to high-voltage endurance is solved.

DETAILED DESCRIPTION OF THE EMBODIMENTS

Figure 1:
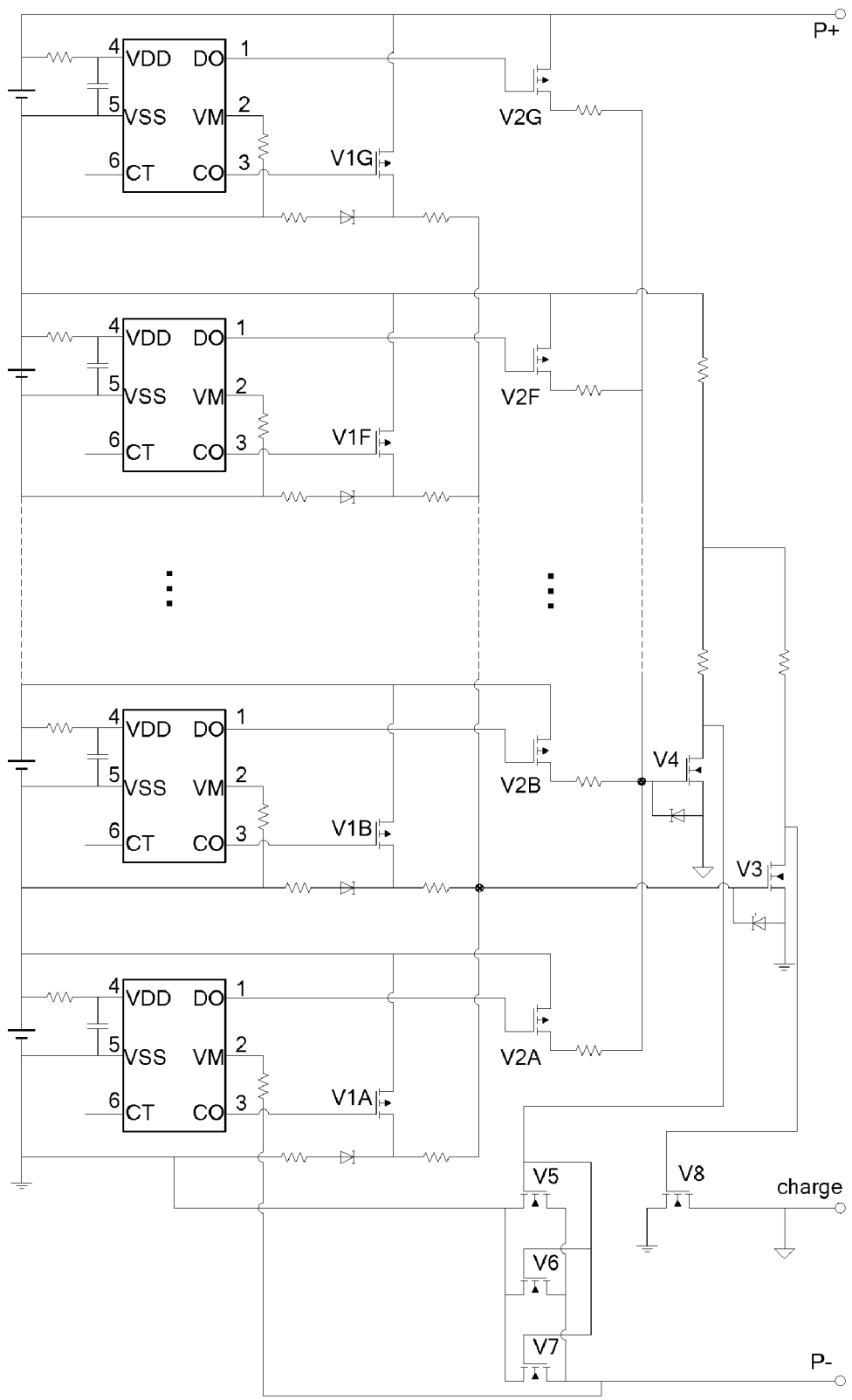
FIG. 1 is a connection diagram of a protection circuit for seven cells connected serially in the prior art.

In order to make the objects, technical scheme, and advantages of the present invention understood better, hereunder the present invention will be further detailed in the embodiments, with reference to the accompanying drawings. It is noted that the embodiments described here are only provided to explain and illustrate the present invention, and shall not be deemed as constituting any limitation to the present invention.

In the embodiments of the present invention, a multi-cell protection chip is formed by providing an expansion connection module to each serially connected multi-cell battery protection integrated circuit module; and a plurality of such multi-cell protection chips are connected through their expansion connection modules to form the multi-cell protection circuit of the present invention. Each multi-cell protection chip carries out logical operation for the expansion output signals from the adjacent multi-cell protection chip and its interior input signals, to determine whether over-charge or over-discharge occurs; the topmost cell protection chip or the bottommost cell protection chip outputs the logical decision result, and the charge/discharge circuit for the cells is controlled by controlling ON/OFF state of the exterior charge control switch and the exterior discharge control switch; in that way, the protection of a plurality of cells against over-charge and over-discharge is implemented.

In the embodiments of the present invention, MOSFETs are used as the charge control switch and the discharge control switch for the multi-cell protection integrated circuit; of course, other devices can be used as the charge control switch and the discharge control switch. Since the multi-cell protection integrated circuit can be of upstream type or downstream type, depending on the signal transmission direction, the implementing circuit for the expansion connection module can be of upstream type or downstream type. An expansion connection module that employs upstream signal transmission can be connected with an exterior PMOSFET to control the cell charge/discharge circuit, while an expansion connection module that employs upstream signal transmission can be connected with an exterior NMOSFET to control the cell charge/discharge circuit.

The input terminals of the serially connected multi-cell battery protection integrated circuit module in the present invention are connected to the positive and negative poles of corresponding cell in the serially connected multi-cell battery, for monitoring the state of the cell, and the output terminals CO and DO output the interior input signal (here, the signal referred to "interior input signal" is for simplifying description, it is input signal for the expansion connection module, while it is output signal for the integrated circuit module) that indicates the state of the cell monitored. The integrated circuit module is as same as the ones in the prior art (see the introduction in the background) and is not described in details.

Figure 2:
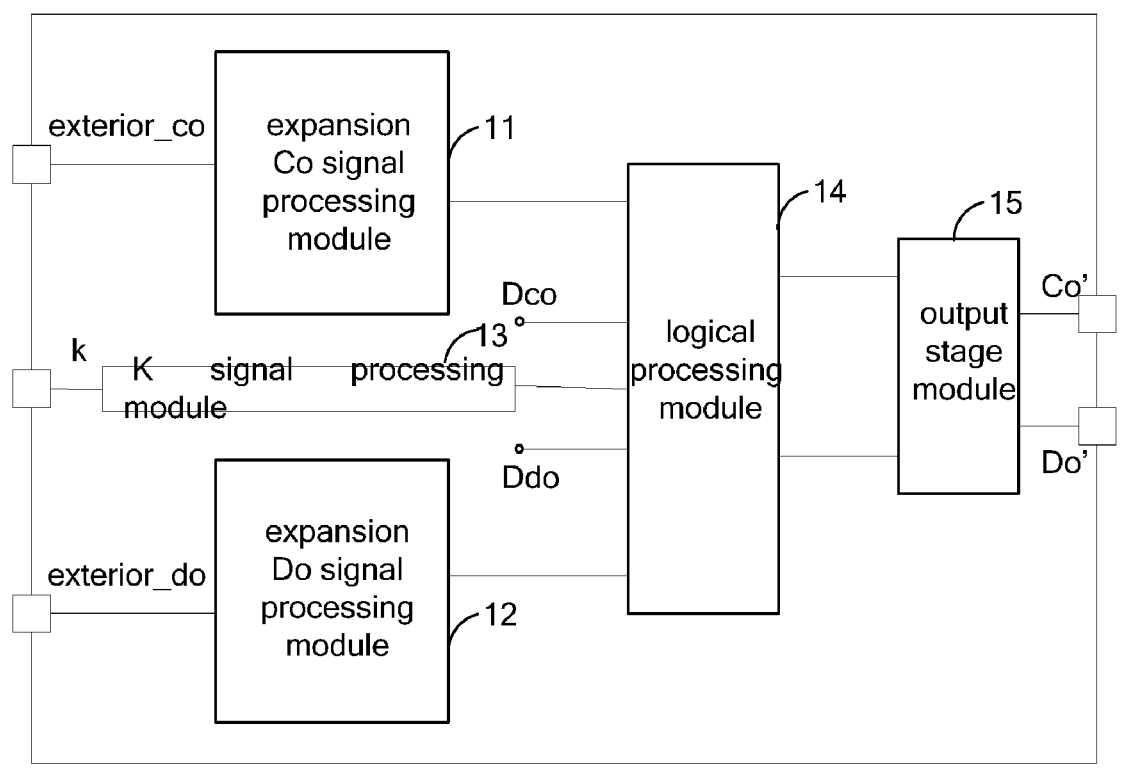
FIG. 2 is a structural diagram of the expansion connection module provided in the present invention.

Now, various embodiments of the expansion connection module in the present invention will be described. FIG. 2 shows the structure of the expansion connection module provided in the embodiments of the present invention. For the convenience of description, only the parts related to the embodiments of the present invention are shown. The expansion connection module can be integrated with the integrated circuit module for protection of a serially connected multi-cell battery into a multi-cell protection chip (hereafter referred to as "IC"), wherein, the number of pins of the IC shown on the drawings is only illustrative, and doesn't represent the actual number of pins.

The expansion connection module comprises an expansion processing module, a K signal processing module 13, a logical processing module 14 and an output stage module 15. Wherein the output terminals of the expansion processing module, the K signal processing module 13 and the serially connected multi-cell battery protection integrated circuit module (not shown in FIG. 2) are all connected to input terminals of the logical processing module 14, the output terminals of the logical processing module 14 are connected to the input terminals of the output stage module 15, and the output terminals of the output stage module 15 serve as the expansion signal output terminals of the expansion connection module.

The expansion signal processing module processes the expansion input signals and converts the expansion input signals into the expansion input signals that can be identified by the IC. The expansion signal processing module comprises an expansion charge signal processing module 11 (also referred to as expansion Co signal processing module) and an expansion discharge signal processing module 12 (also referred to as expansion Do signal processing module). The expansion input signals are the expansion output signals from the adjacent IC, so processing the expansion input signals means processing the expansion output signals from the adjacent IC and converting into an expansion input signals that can be identified by the current IC. Wherein, the expansion input signals comprises an expansion charge input signal and an expansion discharge input signal. The expansion Co signal processing module 11 processes the expansion charge input signal, i.e., processes the expansion charge output signal from the adjacent IC (also referred to as expansion Co output signal). The terminal corresponding to the expansion charge input signal is terminal exterior_co (in the embodiments of the present invention, terminal exterior_co is referred to as an expansion charge signal input terminal). The expansion Do signal processing module 12 processes the expansion discharge input signal, i.e., processes the expansion discharge output signal from the adjacent IC (also referred to expansion Do output signal). The terminal corresponding to the expansion discharge output signal is terminal exterior_do (in the embodiments of the present invention, terminal exterior_do is referred to as an expansion discharge signal input terminal).

The expansion Co signal processing module 11 employs the same circuitous philosophy and processing method as the expansion Do signal processing module 12, i.e., it converts the expansion output signals from the adjacent IC into expansion input signals that can be identified by the current IC, as follows:

Converting the high impedance state of the expansion output signal from the adjacent IC to high level by a pull-up resistor, or converting the high impedance state of the expansion output signal from the adjacent IC to low level by a pull-down resistor; and then converting the expansion output signal at low level from the adjacent IC to low level signal for the current IC by a level shifting device, or converting the expansion output signal at high level from the adjacent IC to high level signal for the current IC by a level shifting device, so as to converting the expansion output signal from the adjacent IC to an expansion input signal that can be identified by the current IC. In the embodiments of the present invention, high level is represented with logical "1", while low level is represented with logical "0".

The K signal processing module 13 processes the expansion selection control signal; the terminal corresponding to the expansion selection control signal is terminal k. In the embodiments of the present invention, terminal k is referred to as an expansion selection control terminal. The expansion selection control signal can be in high level, low level or floating high impedance state. As required for circuit design, the K signal processing module 13 can convert the expansion selection control signal in floating high impedance state to low level signal by a pull-down resistor, or convert the expansion selection control signal in floating high impedance state to high level by a pull-up resistor, so as to convert the expansion selection control signal for the multi-cell protection chip to an expansion selection control signal that can be identified by the multi-cell protection chip. In the embodiments of the present invention, the IC can be in expanded mode or non-expanded mode, depending on the state of the expansion selection control signal; the modes are predefined as follows: if the output from the K signal processing module 13 is 1, the IC is in expanded mode; if the output from the K signal processing module 13 is 0, the IC is in non-expanded mode.

The logical processing module 14 carries out logical decision for the expansion input signal (i.e., the expansion input signal processed by the expansion input signal processing module), the interior input signal and the expansion selection control signal (i.e., the expansion selection control signal processed by the K signal processing module 13), and outputs the decision result via the output stage module 15, so as to control ON/OFF of the exterior MOSFETs, and thereby control ON/OFF of the charge/discharge circuit and achieve cell protection against over-charge and over-discharge. Wherein, the interior input signals comprise an interior Co input signal, the corresponding terminal is Dco; and an interior Do input signal, the corresponding terminal is Ddo. The expansion output signals comprise an expansion Co output signal, the corresponding terminal is Co'; and an expansion Do output signal, the corresponding terminal is terminal Do'.

In the embodiments of the present invention, if the signal transmission direction is upstream direction, the IC is connected with exterior PMOSFETs to control ON/OFF of the charge/discharge circuit. In the over-discharge protection control process, we define: when the IC is in normal state, the input signal terminal exterior_do is in high impedance state, and terminal Ddo is connected to high level; if the IC is in expanded mode (i.e., the terminal k is connected to high level), the output signal Do' is in high impedance state; if the IC is in non-expanded mode (i.e., the terminal k is connected to low level), the output signal Do' is at low level. When the IC is in protection state, the input signal terminal exterior_do is connected to low level, or the terminal Ddo is connected to low level, or the terminal exterior_do is connected to low level, and the terminal Ddo is connected to low level; if the IC is in expanded mode (i.e., the terminal k is connected to high level), the output signal Do' is at low level; if the IC is in non-expanded mode (i.e., the terminal k is connected to low level or in float state), the output signal Do' is at high level. With the definition of the input signals, the expansion connection module carries out logical decision according to the expansion input signals, the interior input signals, and the expansion selection control signal, to obtain a comparison table of output signals as shown in Table 1 as follows:

TABLE 1

| | Input Signal | | Output Signal Do' | |
|---|---|---|---|---|
| State of IC | exterior_do | Ddo | Expanded mode | Non-Expanded mode |
| Normal State | high impedance state | 1 | high impedance state | 0 |
| Protection State | 0 | 1 | 0 | 1 |
| | high impedance state | 0 | | |
| | 0 | 0 | | |

In the over-charge protection control process, we define: when the IC is in normal state, the input signal terminal exterior_co is in high impedance state, and the terminal Dco is connected to high level; if the IC is in expanded mode (i.e., the terminal k is connected to high level), the output signal Co' is in high impedance state; if the IC is in non-expanded mode (i.e., the terminal k is connected to low level), the output signal Co' is at low level; when the IC is in protection state, the input signal terminal exterior_co is connected to low level, or the terminal Dco is connected to low level, or the terminal exterior_co is connected to low level while the terminal Dco is connected to low level; if the IC is in expanded mode (i.e., the terminal k is connected to high level), the output signal Co' is at low level; if the IC is in non-expanded mode (i.e., the terminal k is connected to low level or in float state), the output signal Co' is in high impedance state. The expansion connection module obtains a logical processing comparison table of output signals as shown in Table 2 as follows, according to the input signals. In order to ensure that the exterior PMOSFETs can be switched off according to the output signal Co' when the IC is in non-expanded mode and enters into protection state, the high impedance state of the terminal Co' in the IC is converted by a level shifting device (e.g., a pull-up resistor) to high level.

TABLE 2

| | Input Signal | | Output Signal Co' | |
|---|---|---|---|---|
| State of IC | exterior_co | Dco | Expanded mode | Non-Expanded mode |
| Normal State | high impedance state | 1 | high impedance state | 0 |
| Protection State | 0 | 1 | 0 | high impedance state |
| | high impedance state | 0 | | |
| | 0 | 0 | | |

If the signal transmission direction is downstream direction, the IC can be connected with exterior NMOSFETs to control ON/OFF of the charge/discharge circuit. In that case, we define: when the IC is in normal state, the input signal terminal exterior_do is in high impedance state, and the terminal Ddo is connected to high level; if the IC is in expanded mode (i.e., the terminal k is connected to high level), the output signal Do' is in high impedance state; if the IC is in non-expanded mode (i.e., the terminal k is connected to low level), the output signal Do' is at high level; when the IC is in protection state, the input signal terminal exterior_do is connected to high level, or the terminal Ddo is connected to low level, or the terminal exterior_do is connected to high level while the terminal Ddo is connected to low level; if the IC is in expanded mode (i.e., the terminal k is connected to high level), the output signal Do' is at high level; if the IC is in non-expanded mode (i.e., the terminal k is connected to low level or in float state), the output signal Do' is at low level. With the definition of the input signals, in the over-discharge protection control process, the expansion connection module carries out logical decision according to the expansion input signal, the interior input signals, and the expansion selection control signal, to obtain a comparison table of output signals as shown in Table 3 as follows:

TABLE 3

| | Input Signal | | Output Signal Do' | |
|---|---|---|---|---|
| State of IC | exterior_do | Ddo | Expanded mode | Non-Expanded mode |
| Normal State | high impedance state | 1 | high impedance state | 1 |
| Protection State | 1 | 1 | 1 | 0 |
| | high impedance state | 0 | | |
| | 1 | 0 | | |

In the over-charge protection control process, we define: when the IC is in normal state, the input signal terminal exterior_co is in high impedance state, and the terminal Dco is connected to high level; if the IC is in expanded mode (i.e., the terminal k is connected to high level), the output signal Co' is in high impedance state; if the IC is in non-expanded mode (i.e., the terminal k is connected to low level), the output signal Co' is at low level; when the IC is in protection state, the input signal terminal exterior_co is connected to low level, or the terminal Dco is connected to low level, or the terminal exterior_co is connected to low level while the terminal Dco is connected to low level; if the IC is in expanded mode (i.e., the terminal k is connected to high level), the output signal Co' is at low level; if the IC is in non-expanded mode (i.e., the terminal k is connected to low level or in float state), the output signal Co' is in high impedance state. The expansion connection module obtains a logical processing comparison table of output signals as shown in Table 4 as follows, according to the input signals. In order to ensure that the exterior NMOSFETs can be switched off according to the output signal Co' when the IC is in non-expanded mode and enters into protection state, the high impedance state of the terminal Co' in the IC is converted by a level shifting device (e.g., a pull-down resistor) to low level signal.

TABLE 4

| State of IC | Input Signal | | Output Signal Co' | |
|---|---|---|---|---|
| | exterior_co | Dco | Expanded mode | Non-Expanded mode |
| Normal State | high impedance state | 1 | high impedance state | 1 |
| Protection State | 1 | 1 | 1 | high impedance state |
| | high impedance state | 0 | | |
| | 1 | 0 | | |

Figure 3A:
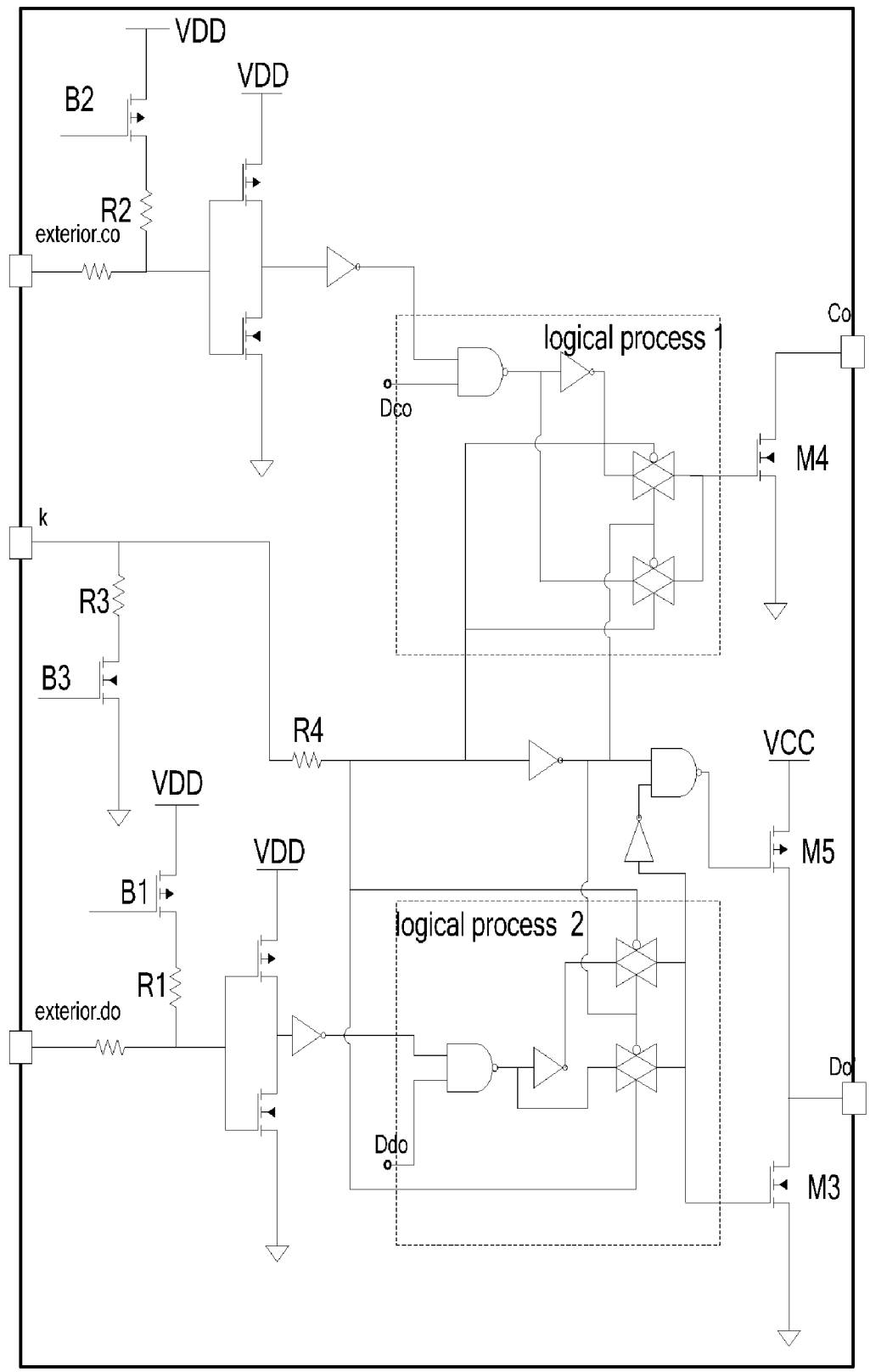
FIG. 3a is a diagram of preferable circuit connection of the expansion connection module in upstream signal transmission direction in the first embodiment of the present invention.

FIG. 3a shows a preferable circuit of the expansion connection module in upstream signal transmission direction in a first embodiment of the present invention. Since the overcharge protection circuit and the over-discharge protection circuit are similar to each other, and employ the same logical signal processing approach, hereunder the working principle of the optimal circuit of the expansion connection module in the first embodiment of the present invention will be described in the case of the over-discharge protection circuit.

NAND gates are employed for logical processing, and 1-out-of-2 path selectors composed of transfer gates are used for path selection.

When the IC is in normal state, according to the definition of the input terminals of the expansion connection module, the expansion discharge signal input terminal exterior_do is in high impedance state, and is pulled up by a pull-up resistor R1 to high level, and then outputs a high level signal by a level shifting device composed of a PMOSFET, an NMOSFET, and an inverter. If the IC is in expanded mode (i.e., the expansion selection control terminal k is at high level), the PMOSFET M5 in the two MOSFETs connected to the output terminal Do' keeps in OFF state. The logical operation is NAND operation, i.e., logical NAND operation is performed between the high level signal from the terminal exterior_do and the signal from the interior Do signal input terminal Ddo (high level in normal state) in the cell protection chip to output low level signal, so that the NMOSFET M3 keeps in OFF state, and the output from the output terminal Do' is in high impedance state. If the IC is in non-expanded mode (i.e., the expansion selection control terminal k is at low level or in float state), the logical operation is NAND operation, i.e., the grid electrode of the PMOSFET M5 in the two MOSFETs connected to the output terminal Do' is not clamped, and logical NAND operation is performed between the high level signal from the terminal exterior_do and the signal from the interior Do signal input terminal Ddo (high level in normal state) in the cell protection chip to output low level, which is inverted by the inverter to output high level, so that the NMOSFET M3 gates on, and therefore the output from the output terminals Do' is low level.

When the IC is in protection state (i.e., when either of the Do signal input terminal Ddo in the IC or the expansion discharge signal input terminal exterior_do is at low level), the integrated circuit for cell protection enters into over-discharge protection state. Since the case that the integrated circuit for cell protection enters into over-discharge protection state due to low level at the Do signal input terminal Ddo and the case that the integrated circuit for cell protection enters into over-discharge protection state due to low level at the expansion discharge signal input terminal exterior_do are in the same principle, hereunder the principle of the IC in protection state will be described in the case that the integrated circuit for cell protection enters into over-discharge state due to low level at the expansion discharge signal input terminal exterior_do.

The input to the expansion discharge signal input terminal exterior_do is low level; after level shifting by a level shifting device composed of a PMOSFET, an NMOSFET, and an inverter, the output is low level. If the IC is in expanded mode (i.e., the expansion selection control terminal k is at high level), the logical operation is NAND operation, i.e., logical NAND operation is performed between the low level signal from the terminal exterior_do and the signal from the Do signal input terminal Ddo (high level) to output high level, so that the NMOSFET M3 gates on, and the output terminal Do' outputs a low level signal. If the IC is in non-expanded mode (i.e., the expansion selection control terminal k is at low level or in float state), the logical operation is AND operation, i.e., logical AND operation is performed between the low level signal from the terminal exterior_do and the signal from the Do signal input terminal Ddo to output high level, which is inverted by the inverter to output low level, so that the PMOSFET M5 gates on, and the output terminal Do' outputs a high level signal.

Figure 3B:
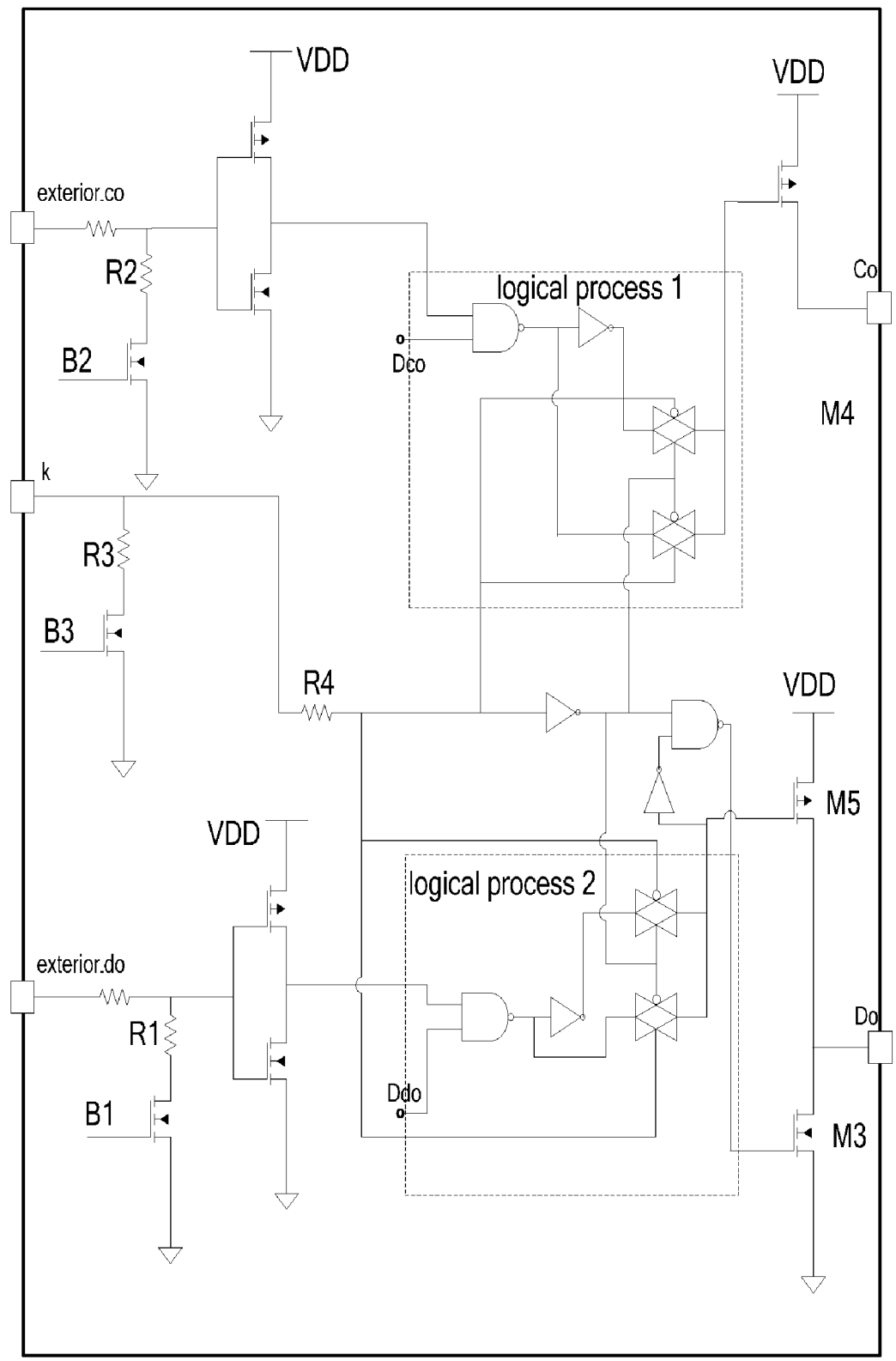
FIG. 3b is a diagram of preferable circuit connection of the expansion connection module in downstream signal transmission direction in the first embodiment of the present invention.

FIG. 3b shows a preferable circuit of the expansion connection module in downstream signal transmission direction in the first embodiment of the present invention. Compared to the circuit in upstream signal transmission direction shown in FIG. 3a, the difference lies in the level shifting for the expansion input signal and the selection of potential of the expansion output signal. In the downstream signal transmission mode, the high impedance state of the expansion input signal is pulled down by a pull-down resistor R1 to low level. In downstream signal transmission mode, since the expansion connection module is connected to exterior NMOSFETs to control ON/OFF of the cell charge/discharge circuit, AND operation is chosen for the potential of the expansion output signal if the IC is in expanded mode, so as to adjust the output in normal state to high impedance state; NAND operation is chosen if the IC is in non-expanded mode, so as to adjust the output in normal state to high level, and thereby achieve cell protection against over-charge and over-discharge.

Since the principle of the circuit is identical to the principle of the circuit in upstream transmission mode, it will not be further detailed here.

Figure 4A:
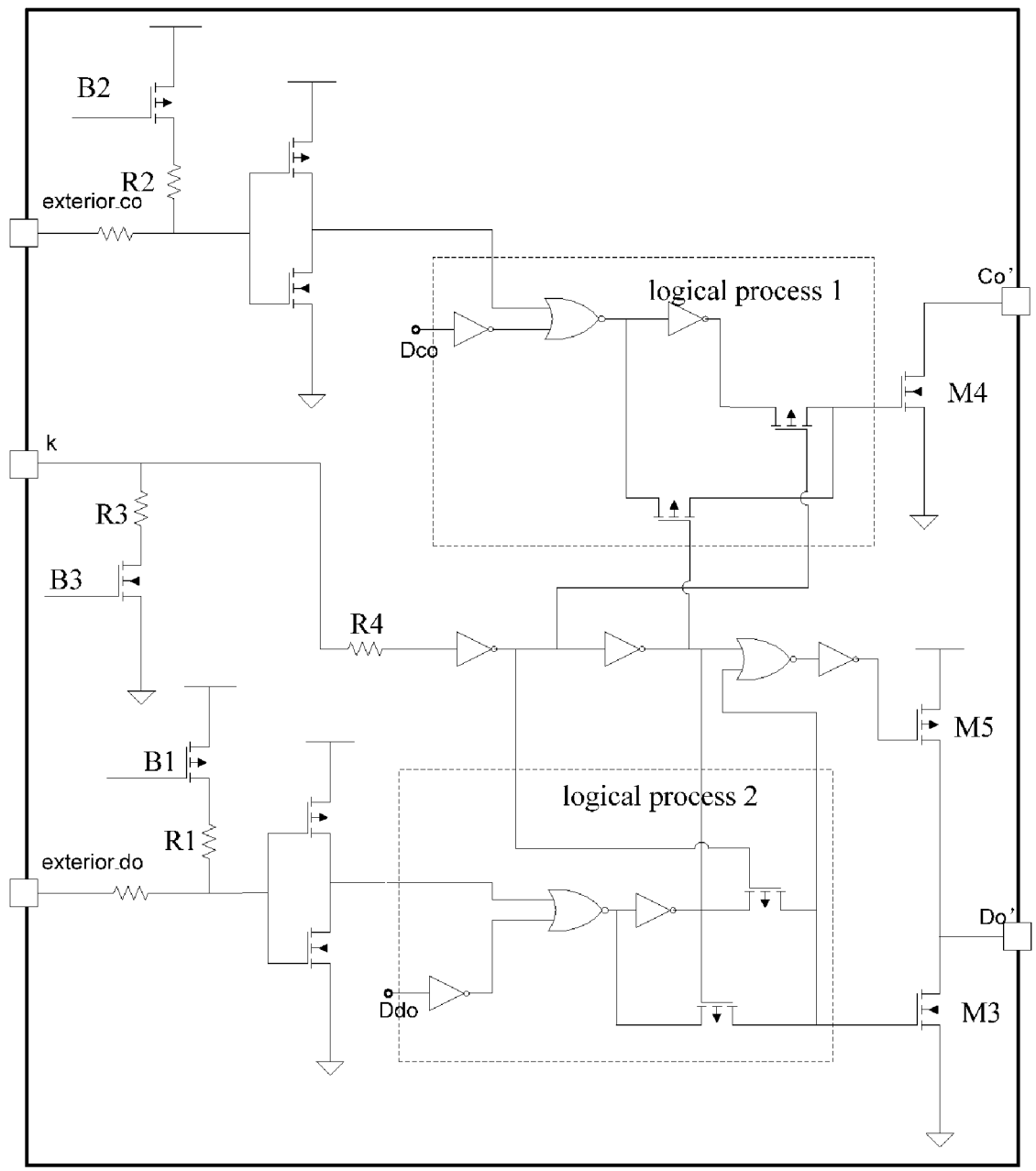
FIG. 4a is a diagram of circuit connection of the expansion connection module in upstream signal transmission direction in the second embodiment of the present invention.

FIG. 4a shows the circuit of the expansion connection module in upstream signal transmission direction in a second embodiment of the present invention. Compared to the circuit shown in FIG. 3a, the difference of the circuit lies in: the high impedance state of the expansion input signal is pulled up by a pull-up resistor R1 to high level, and then the high level is shifted by a level shifting device composed of a PMOSFET and an NMOSFET to output low level; NOR operation is used in the logical processing, and a single MOSFET is used in the path selection. Since the principle of the circuit is similar to the principle of the circuit shown in FIG. 3a, it will only be described in brief hereunder.

When the IC is in normal state, the input to the expansion discharge signal input terminal exterior_do is in high impedance state; the high impedance state is pulled up by a pull-up resistor R1 to high level, and then the high level is shifted by a level shifting device composed of a PMOSFET and an NMOSFET to output low level. If the IC is in expanded mode (i.e., the expansion selection control terminal k is at high level), the logical operation is OR operation, and the PMOSFET M5 keeps in OFF state, i.e., OR operation is performed between the low level signal from the terminal exterior_do and the low level inverted from the signal from the interior Do signal input terminal Ddo (high level in normal state) to output low level, so that the NMOSFET M3 is controlled in OFF state, and the output from the output terminal Do' is in high impedance state. If the IC is in non-expansion state (i.e., the expansion selection control terminal k is at low level or in float state), the logical operation is NOR operation, i.e., NOR operation is performed between the low level signal from the terminal exterior_do and the low level inverted from the signal from the interior Do signal input terminal Ddo (high level in normal state) to output high level, so that the NMOSFET M3 gates on, and thereby the output terminal Do' outputs low level.

When the IC is in protection state (i.e., when either of the Do signal input terminal Ddo in the IC or the expansion discharge signal input terminal exterior_do is at low level), the integrated circuit for cell protection enters into over-discharge protection state. Since the case that the integrated circuit for cell protection enters into over-discharge protection state due to low level at the Do signal input terminal Ddo and the case that the integrated circuit for cell protection enters into over-discharge protection state due to low level at the expansion discharge signal input terminal exterior_do are in the same principle, hereunder the principle of the IC in protection state will be described in the case that the integrated circuit for cell protection enters into over-discharge state due to low level at the expansion discharge signal input terminal exterior_do.

The input to the expansion discharge signal input terminal exterior_do is low level; after level shifting by a level shifting device composed of a PMOSFET, an NMOSFET, and an inverter, the output is high level. If the IC is in expanded mode (i.e., the expansion selection control terminal k is at high level), the logical operation is OR operation, and the PMOSFET M5 keeps in OFF state, i.e., OR operation is performed between the high level signal from the terminal exterior_do and the signal inverted from the signal from the interior Do signal input terminal Ddo to output high level, so that the NMOSFET M3 gates on, and the output from the output terminal Do' is low level. If the IC is in non-expanded mode (i.e., the expansion selection control terminal k is at low level or in float state), the logical operation is NOR operation, i.e., NOR operation is performed between the high level signal from the terminal exterior_do and the signal from the interior Do signal input terminal Ddo to output low level, so that the PMOSFET M5 gates on but the NMOSFET M3 keeps in OFF state, and thereby the output terminal Do' outputs a high level signal.

Figure 4B:
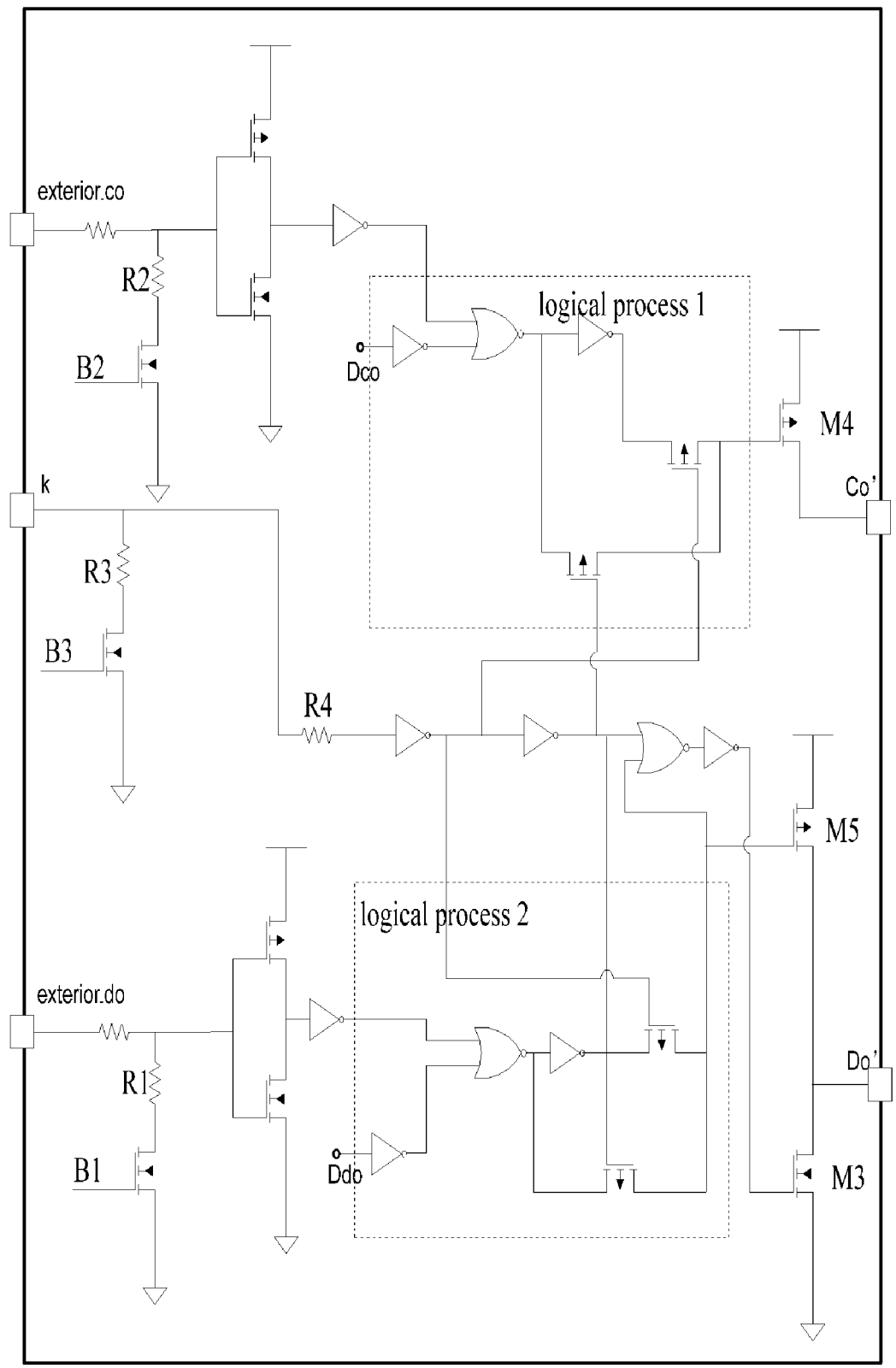
FIG. 4b is a diagram of circuit connection of the expansion connection module in downstream signal transmission direction in the second embodiment of the present invention.

FIG. 4b shows the circuit of the expansion connection module in downstream signal transmission direction in the second embodiment of the present invention. Compared to the circuit in upstream signal transmission direction shown in FIG. 4a, the difference lies in the level shifting for the expansion input signal and the selection of potential of the expansion output signal. In the downstream signal transmission mode, the high impedance state of the expansion input signal is pulled down by a pull-down resistor R1 to low level. In downstream signal transmission mode, since the expansion connection module is connected to exterior NMOSFETs to control ON/OFF of the cell charge/discharge circuit, AND operation is chosen for the potential of the expansion output signal if the IC is in expanded mode, so as to adjust the output in normal state to high impedance state; NAND operation is chosen if the IC is in non-expanded mode, so as to adjust the output in normal state to high level, and thereby achieve cell protection against over-charge and over-discharge.

Since the principle of the circuit is identical to the principle of the circuit in upstream signal transmission mode shown in FIG. 4a, it will not be further detailed here.

Figure 5A:
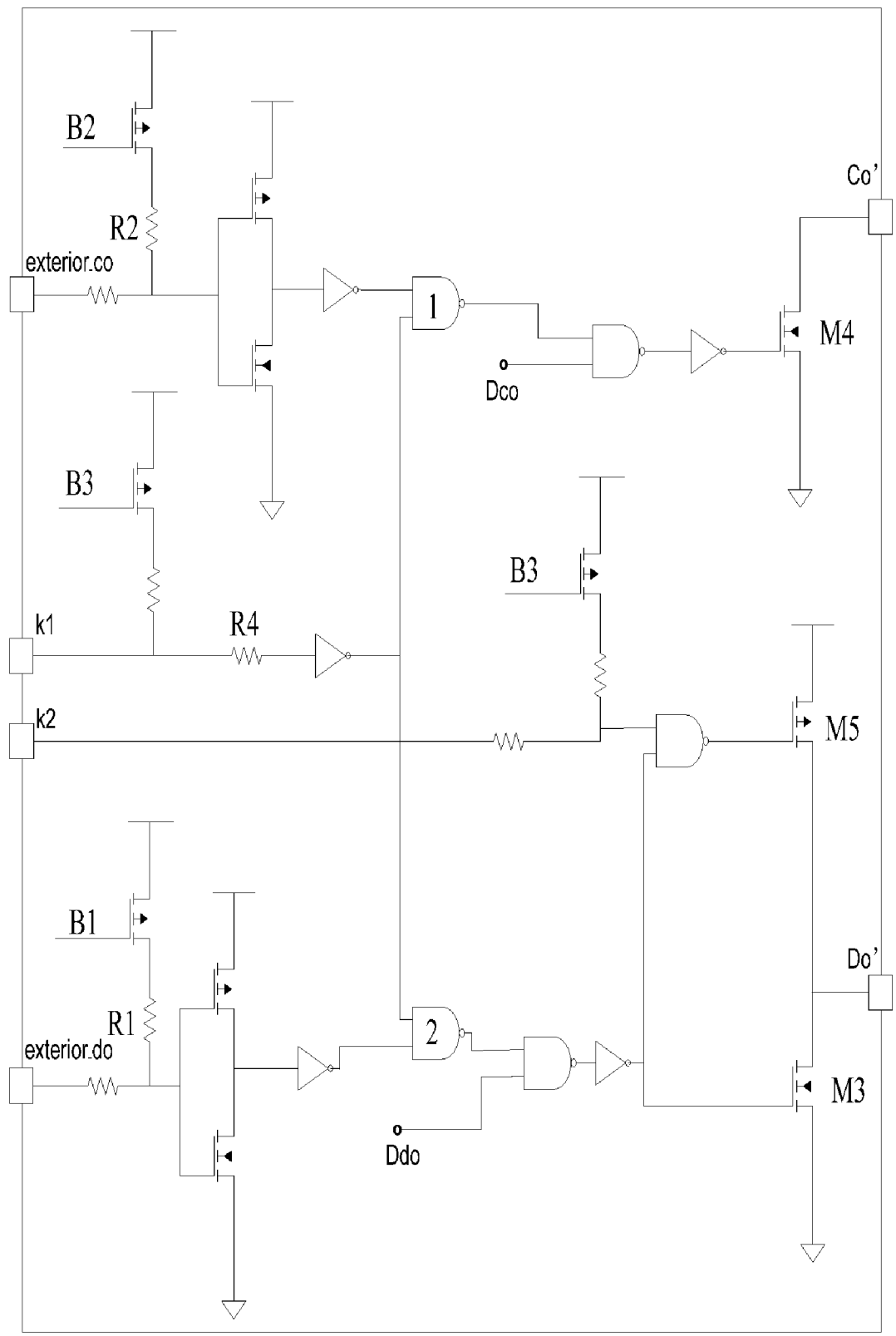
FIG. 5a is a diagram of circuit connection of the expansion connection module in upstream signal transmission direction in the third embodiment of the present invention.

FIG. 5a shows the circuit of the expansion connection module in upstream signal transmission direction in a third embodiment of the present invention. Since the over-charge and the over-discharge circuit are similar to each other and the logical signal processing methods are identical, hereunder the circuit will be described in the case of over-discharge protection.

If the four input terminals exterior_co, k1, k2, and exterior_do of the expansion connection module are in float state (i.e., all inputs are in high impedance state, which is to say, there is only a single IC in the integrated circuit for cell protection provides charge/discharge protection), all the four input terminals are pulled up to high level by pull-up resistors in the interior circuits. In that case, since the output of terminal k1 is inverted by an inverter to low level, the outputs from logical gates 1 and 2 are kept at high level, and therefore the output from output terminal Co' and the output from output terminal Do' are controlled only by the interior input signals Dco and Ddo. In that way, cell protection against over-charge and over-discharge is achieved, without any change to the application of the IC.

If a plurality of ICs are connected serially, k1 and k2 interwork to control the ICs in expanded mode or non-expanded mode. If the signal transmission direction is upstream direction, the terminal k1 of the bottommost IC is connected to high level or in float state, the terminals k1 of the other ICs are connected to low level, the terminal k2 of the topmost IC is connected to high level or in float state, and the terminals k2 of the other ICs are connected to low level. In that case, the topmost IC is in non-expanded mode, while the other ICs are in expanded mode. If the signal transmission direction is downstream direction, the terminal k1 of the topmost IC is connected to high level or in float state, the terminals k1 of the other ICs are connected to low level, the terminal k2 of the bottommost IC is connected to high level or in float state, and the terminals k2 of the other ICs are connected to low level. In that case, the bottommost IC is in non-expanded mode, while the other ICs are in expanded mode.

If the signal transmission direction is upstream direction, the topmost IC can be connected with exterior PMOSFETs to control ON/OFF of the charge/discharge circuit. For the logical processing of over-discharge, we define: when the IC is in normal state, the input signal terminal exterior_do is connected to low level, the terminal Ddo is connected to high level; if the IC is in expanded mode, the terminal Do' outputs a low level signal; if the IC is in non-expanded mode, the terminal Do' outputs a low level signal. When the IC is in protection state, the input signal terminal exterior_do is in high impedance state, or the terminal Ddo is connected to low level, or the terminal exterior_do is in high impedance state while the terminal Ddo is connected to low level; if the IC is in expanded mode, the terminal Do' output high impedance state; if the IC is in non-expanded mode, the terminal Do' outputs a high level signal. With above definition, the comparison table of input signals vs. output signals when the IC in normal state or protection state is shown in Table 5 as follows:

TABLE 5

| | Input Signal | | Output Signal Do' | |
| --- | --- | --- | --- | --- |
| State of IC | exterior_do | Ddo | Expanded mode | Non-Expanded mode |
| Normal State | 0 | 1 | 0 | 0 |
| Protection state | high impedance state | 1 | high impedance state | 1 |
| | 0 | 0 | | |
| | high impedance state | 0 | | |

For logical processing of over-charge, we define: when the IC is in normal state, the input signal terminal exterior_co is connected to low level, and the terminal Dco is connected to high level; if the IC is in expanded mode, the terminal Co' outputs a low level signal; if the IC is in non-expanded mode, the terminal Co' outputs a low level signal. When the IC is in protection state, the input signal terminal exterior_co is in high impedance state, or the terminal Dco is connected to low level, or the terminal exterior_co is in high impedance state while the terminal Dco is connected to low level; if the IC is in expanded mode, the output from terminal Co' is in high impedance state; if the IC is in non-expanded mode, the output from terminal Co'is in high impedance state. With above definition, the comparison table of input signals vs. output signals when the IC is in normal state or protection state is shown in Table 6 as follows. In order to ensure that the exterior pmosfets can be switched off according to the output signal Co' when the IC is in non-expanded mode and enters into protection state, the high impedance state of the terminal Co' in the IC is converted by a level shifting device (e.g., a pull-up resistor) to high level.

TABLE 6

| | | | Output Signal Co' | |
|---|---|---|---|---|
| | Input Signal | | | Non-Expanded |
| State of IC | exterior_co | Dco | Expanded mode | mode |
| Normal State | 0 | 1 | 0 | 0 |
| Protection state | high impedance state | 1 | high impedance state | high impedance state |
| | 0 | 0 | | |
| | high impedance state | 0 | | |

When the IC is in normal state, the input to the expansion discharge signal input terminal exterior_do is low level; after level shifting by a level shifting device composed of a PMOSFET, an NMOSFET and an inverter, the output is low level. In addition, if the IC is in expanded mode, the terminal k1 is connected to low level; if the IC is on the top of the integrated circuit for cell protection, the terminal k2 is in float state or connected to high level; otherwise the terminal k2 is connected to low level. The low level signal from terminal k1 is inverted by an inverter to output high level; then, NAND operation is carried out between the high level signal and the low level signal from the terminal exterior_do to output high level; next, NAND operation is carried out between the high level signal and the signal from the Do signal input terminal Ddo (high level in normal state) to output low level; finally, high level is outputted through the inverter, so that the NMOSFET M3 gates on and the output terminal Do' outputs a low level signal. Similarly, the output terminal Co' outputs a low level signal. If the IC is in non-expanded mode, the terminal k1 is in float state or connected to high level, and the terminal k2 is connected to low level. The terminal k2 controls the output from the IC as CMOS output (i.e., the low level signal from the terminal k2 doesn't cause the PMOSFET M5 to gate on); in addition, the high level signal from terminal k1 is inverted by an inverter to output low level; then, NAND operation is carried out between the low level signal and the low level signal from the terminal exterior_do to output high level; next, NAND operation is carried out between the high level signal and the signal from the Do signal input terminal Ddo (high level in normal state) to output low level; finally, high level is outputted through the inverter, so that the NMOSFET M3 gates on and the output terminal Do' outputs a low level signal.

When the IC is in protection state (i.e., the Do signal input terminal Ddo in the IC is at low level, or the expansion discharge signal input terminal exterior_do is in high impedance state), the integrated circuit for cell protection enters into over-discharge protection state; when the Co signal input terminal Dco in the IC is at low level, or the expansion charge signal input terminal exterior_co is in high impedance state, the integrated circuit for cell protection enters into over-charge protection state. Since the case that the circuit enters into over-charge protection state and the case that the circuit enters into over-discharge protection state are in the same principle, and the case that the integrated circuit for cell protection enters into protection state due to low level at the Do signal input terminal Ddo and the case that the integrated circuit for cell protection enters into protection state due to high impedance state of the expansion discharge signal input terminal exterior_do are in the same principle, hereunder the principle of the IC in protection state will be described in the case that the integrated circuit for cell protection enters into over-discharge state due to high impedance state of the expansion discharge signal input terminal exterior_do.

The input to the expansion discharge signal input terminal exterior_do is in high impedance state; the high impedance state is converted to high level by a pull-up resistor R1, and then shifted by a level shifting device composed of a PMOSFET, a NMOSFET and an inverter to output high level. If the IC is in expanded mode, the terminal k1 is connected to low level; if the IC is on the top of the integrated circuit for cell protection, the terminal k2 is in float state or connected to high level; otherwise the terminal k2 is connected to low level. The low level signal from terminal k1 is inverted by an inverter to output high level; then, NAND operation is carried out between the high level signal and the high level signal from the terminal exterior_do to output low level; next, NAND operation is carried out between the low level signal and the signal from the Do signal input terminal Ddo to output high level; finally, low level is outputted through the inverter, so that NMOSFET M3 gates off and the output terminal Do' outputs a high impedance state signal. Similarly, the output terminal Co' outputs a high impedance state signal. If the IC is in non-expanded mode, the terminal k1 is in float state or connected to high level, and the terminal k2 is connected to low level. The principle is identical to the principle described above, and will not be described further here.

Figure 5B:
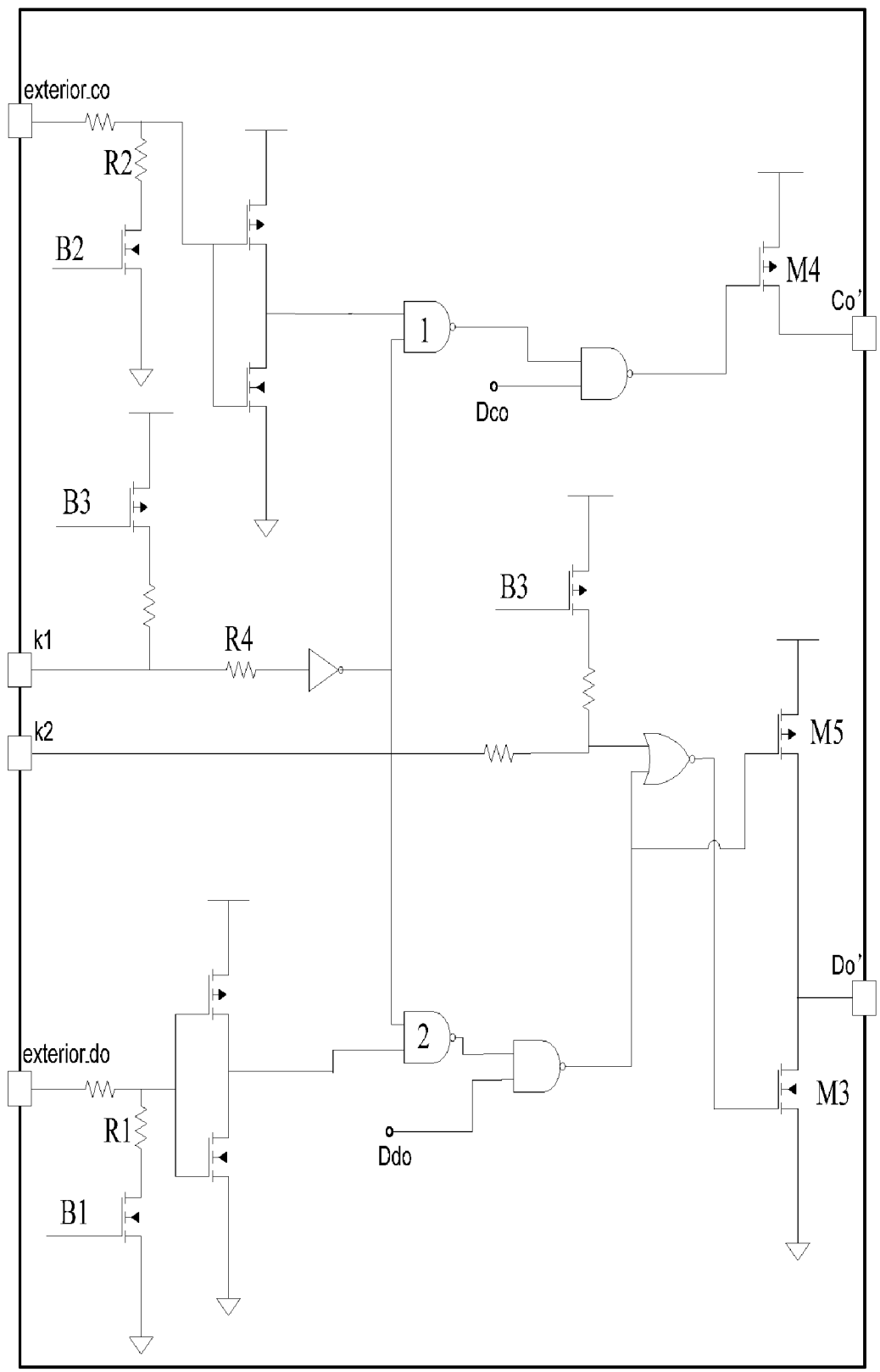
FIG. 5b is a diagram of circuit connection of the expansion connection module in downstream signal transmission direction in the third embodiment of the present invention.

FIG. 5b shows the circuit of the expansion connection module in downstream signal transmission direction in the third embodiment of the present invention.

If the signal transmission direction is downstream direction, the ON/OFF of the exterior NMOSFETs will be controlled by the output from the bottommost IC; in that case, we define: when the IC is in normal state, the input signal terminal exterior_do is connected to high level, the terminal Ddo is connected to high level; if the IC is in expanded mode, the terminal Do' outputs a high level signal; if the IC is in non-expanded mode, the terminal Do' outputs a high level signal. When the IC is in protection state, the input signal terminal exterior_do is in high impedance state, or the terminal Ddo is connected to low level, or the terminal exterior_do is in high impedance state while the terminal Ddo is connected to low level; if the IC is in expanded mode, the terminal Do' outputs a high impedance state signal; if the IC is in non-expanded mode, the terminal Do's outputs a low level signal. With above definition, in the logical processing for over-discharge, the comparison table of input signals vs. output signals when the IC in normal state or protection state is shown in Table 7 as follows:

TABLE 7

| | Input Signal | | Output Signal Do' | |
|---|---|---|---|---|
| State of IC | exterior_do | Ddo | Expanded mode | Non-Expanded mode |
| Normal State | 1 | 1 | 1 | 1 |
| Protection State | high impedance state | 1 | high impedance state | 0 |
| | 1 | 0 | | |
| | high impedance state | 0 | | |

For logical processing of over-charge, we define: when the IC is in normal state, the input signal terminal exterior_co is connected to high level, and the terminal Dco is connected to high level; if the IC is in expanded mode, the terminal Co' outputs a high level signal; if the IC is in non-expanded mode, the terminal Co' outputs a high level signal. When the IC is in protection state, the input signal terminal exterior_co is in high impedance state, or the terminal Dco is connected to low level, or the terminal exterior_co is in high impedance state while the terminal Dco is connected to low level; if the IC is in expanded mode, the output from terminal Co' is in high impedance state; if the IC is in non-expanded mode, the terminal Co' outputs a low level signal. With above definition, the comparison table of input signals vs. output signals when the IC is in normal state or protection state is shown in Table 8 as follows. In order to ensure that the exterior NMOSFETs can be switched off according to the output signal Co' when the IC is in non-expanded mode and enters into protection state, the high impedance state of the terminal Co' in the IC is converted by a level shifting device (e.g., a pull-down resistor) to low level.

TABLE 8

| | Input Signal | | Output Signal Co' | |
|---|---|---|---|---|
| State of IC | exterior_co | Dco | Expanded mode | Non-Expanded mode |
| Normal State | 1 | 1 | 1 | 1 |
| Protection State | high impedance state | 1 | high impedance state | high impedance state |
| | 1 | 0 | | |
| | high impedance state | 0 | | |

When the IC is in normal state, the input to the expansion discharge signal input terminal exterior_do is high level; after level shifting by a level shifting device composed of a PMOSFET, an NMOSFET and an inverter, the output is low level. If the IC is in expanded mode, the terminal k1 is connected to low level; if the IC is on the top of the integrated circuit for cell protection, the terminal k2 is in float state or connected to high level; otherwise the terminal k2 is connected to low level. The low level signal from terminal k1 is inverted by an inverter to output high level; then, NAND operation is carried out between the high level signal and the low level signal from the terminal exterior_do to output high level; next, NAND operation is carried out between the high level signal and the signal from the Do signal input terminal Ddo (high level in normal state) to output low level, so that the PMOSFET M5 gates on and the output terminal Do' outputs a high level signal. Similarly, the output terminal Co' outputs a high level signal. If the IC is in non-expanded mode, the terminal k1 is in float state or connected to high level, and the terminal k2 is connected to low level. The principle is identical to the principle described above, and will not be described further here.

When the IC is in protection state (i.e., the Do signal input terminal Ddo in the IC is at low level, or the expansion discharge signal input terminal exterior_do is in high impedance state), the integrated circuit for cell protection enters into over-discharge protection state. When the Co signal input terminal Dco in the IC is at low level, or the expansion charge signal input terminal exterior_co is in high impedance state, the integrated circuit for cell protection enters into over-charge protection state. Since the case that the circuit enters into over-charge protection state and the case that the circuit enters into over-discharge protection state are in the same principle, and the case that the integrated circuit for cell protection enters into protection state due to low level at the interior Do signal input terminal Ddo and the case that the integrated circuit for cell protection enters into protection state due to high impedance state of the expansion discharge signal input terminal exterior_do are in the same principle, hereunder the principle of the IC in protection state will be described in the case that the integrated circuit for cell protection enters into over-discharge state due to high impedance state of the expansion discharge signal input terminal exterior_do.

The input to the expansion discharge signal input terminal exterior_do is in high impedance state; the high impedance state is converted to low level by a pull-down resistor R1, and then shifted by a level shifting device composed of a PMOSFET and a NMOSFET to output high level. If the IC is in expanded mode, the terminal k1 is connected to low level; if the IC is on the top of the integrated circuit for cell protection, the terminal k2 is in float state or connected to high level; otherwise the terminal k2 is connected to low level. The low level signal from terminal k1 is inverted by an inverter to output high level; then, NAND operation is carried out between the high level signal and the high level signal from the terminal exterior_do to output low level; next, NAND operation is carried out between the low level signal and the signal from the Do signal input terminal Ddo to output high level, so that the PMOSFET M5 keeps in OFF state and the output terminal Do' outputs a high impedance state signal. Similarly, the output terminal Co' outputs a high impedance state signal. If the IC is in non-expanded mode, the terminal k1 is in float state or connected to high level, and the terminal k2 is connected to low level. The principle is identical to the principle described above, and will not be described further here.

Figure 6A:
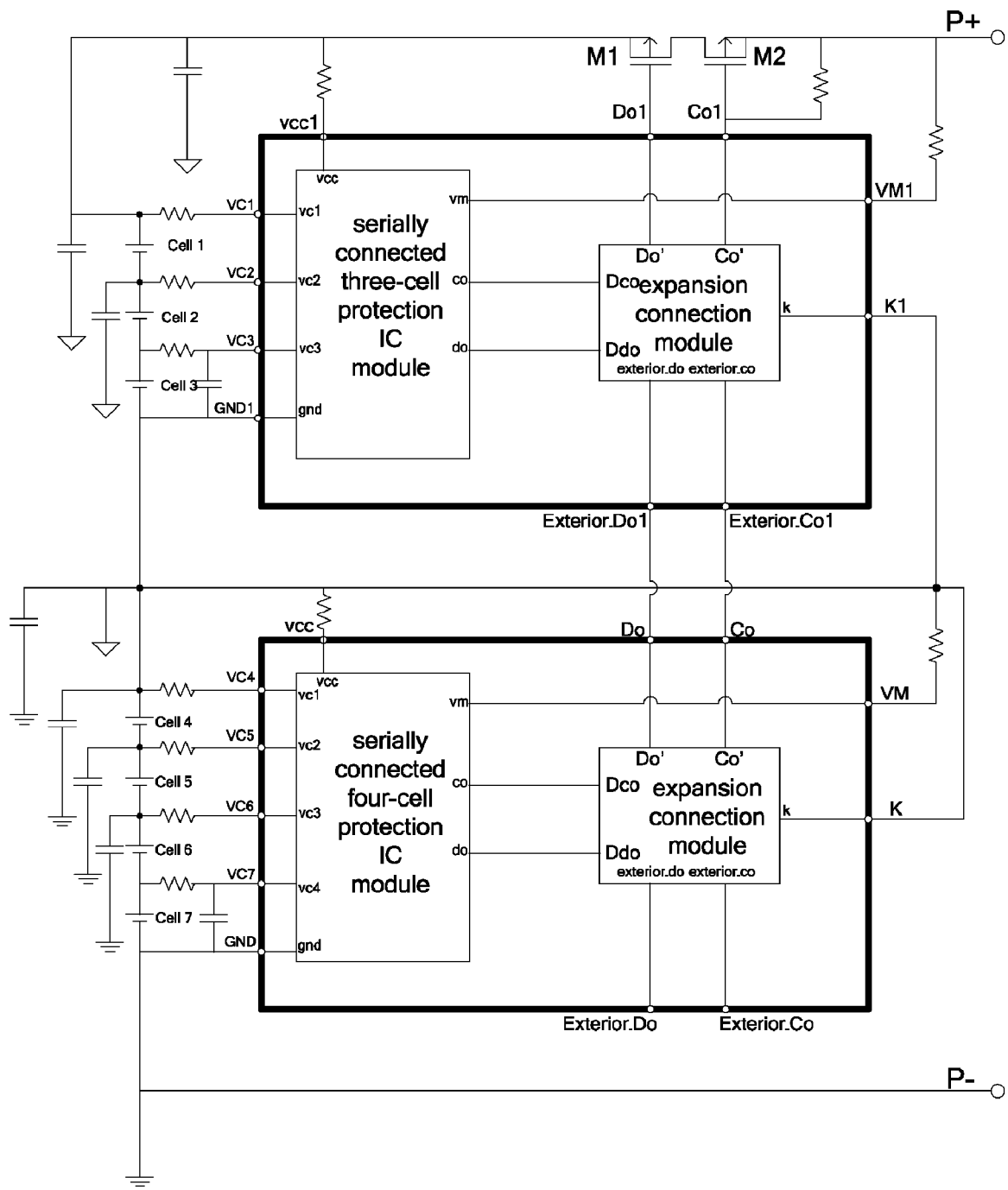
FIG. 6a is a diagram of circuit connection of the integrated circuit for cell protection in upstream signal transmission direction in the embodiments of the present invention.

FIG. 6a shows the expansion connection of the integrated circuit for cell protection in upstream signal transmission direction in the embodiments of the present invention. Hereunder the expansion connection will be described in an example that a serially connected four-cell battery protection integrated circuit module is equipped with an expansion connection module and an example that a serially connected three-cell battery protection integrated circuit module is equipped with an expansion connection module.

In the serially connected three-cell battery protection integrated circuit module, the terminals co and do are connected to terminals Dco and Ddo of its expansion connection module, so that the serially connected three-cell battery protection integrated circuit module and the expansion connection module form an IC for protection of a three-cell battery. The pins VC1, VC2, and VC3 of the IC for protection of the three-cell battery are connected to cells 1, 2, and 3, to collect charging voltage or discharging voltage signal from the cells. The pins Co1 and Do1 are connected to the MOSFET in the exterior charge/discharge control circuit, and the ON/OFF of the charge/discharge circuit is connected by the outputs from pins Co1 and Do1, so as to achieve cell protection against over-charge and over-discharge. If the signal transmission direction is upstream direction, the pins Co1 and Do1 are connected to an exterior PMOSFET to control the charge/discharge circuit. In addition, pin Co1 is connected to the positive pole of the power supply unit through a resistor, to pull up the high impedance state of pin Co1 to high level. Pin K1 is the expansion selection control terminal of the multi-cell protection above the three-cell protection IC. In this example, since there is no other cell protection IC above the three-cell protection IC, it indicates the three-cell protection IC is in non-expanded mode, which is equivalent to that, the pin K1 is connected to low level or in float state. Pin VM1 is the over-current detection terminal of the three-cell protection IC, and it is connected to the positive pole of the power supply unit. Pin VCC1 is the positive power input terminal of the three-cell protection IC, and it is connected to the positive pole of the power supply unit.

In the serially connected four-cell battery protection integrated circuit module, the terminals co and do are connected to terminals Dco and Ddo of the expansion connection module, so that the serially connected three-cell battery protection integrated circuit module and the expansion connection module form a three-cell protection IC. The pins VC1, VC2, VC3, and VC4 of the three-cell protection IC are connected to cells 4, 5, 6, and 7, to collect charging voltage or discharging voltage signals from the cells. Pin VCC is the positive power input terminal of the four-cell protection IC. Pin K is the expansion selection control terminal of the multi-cell protection IC above the four-cell protection IC (In this example, the multi-cell protection IC is the three-cell protection IC described above), which is to say, the four-cell protection IC is in expanded mode, which is equivalent to that the pin K is connected to high level. Pin VM is the over-current detection terminal of the four-cell protection IC. Pins Exterior_Do and Exterior_Co are over-discharge expansion application input terminal and over-charge expansion application input terminal of the multi-cell protection IC below the four-cell protection IC. In this example, since there is no other cell protection IC below the four-cell protection IC, the pins Exterior_Do and Exterior_Co are in float state, i.e., both the input to the pin Exterior_Do and the input to the pin Exterior_Co are in high impedance state. The expansion application discharge control output terminals Do and the expansion application charge control output terminal Co of the four-cell protection IC are connected to the expansion application input terminals Exterior_Do1 and Exterior_Co1 of the three-cell protection IC, so as to transmit the state of the four-cell protection IC to the three-cell protection IC. The expansion connection module of the for the three-cells protection IC carries out logical decision, according to the states of the expansion signal input terminals Exterior_Co1 and Exterior_Do1, the states of the interior signal input terminals Dco and Ddo, and the state of the input terminal K1, so as to control ON/OFF of the exterior PMOS according to the logical decision result, and thereby controls ON/OFF of the charge/discharge circuit, and achieve cell protection against over-charge and over-discharge.

In this example, after the three-cell protection IC and the four-cell protection IC are connected to each other via their expansion connection modules, they carry out logical decision according to the states of the input terminal and provide outputs for over-discharge protection, as illustration in the following comparison table of terminal inputs vs. terminal outputs:

TABLE 9

| State of IC | Input Signal | | | | | | Output Signal | |
|---|---|---|---|---|---|---|---|---|
| | K | K1 | Exterior_Do | Exterior_Do1 | Ddo | Ddo1 | Do | Do1 |
| Normal State | 1 | 0 | high impedance state | high impedance state | 1 | 1 | high impedance state | 0 |
| Protection State | 1 | 0 | high impedance state | 0 | 0 | 1 | 0 | 1 |
| | 1 | 0 | high impedance state | high impedance state | 1 | 0 | high impedance state | 1 |
| | 1 | 0 | high impedance state | 0 | 0 | 0 | 0 | 1 |

Wherein, terminal Ddo is the Ddo terminal of the expansion connection module of the four-cell protection IC, and terminal Ddo1 is the Ddo terminal of the expansion connection module of the three-cell protection IC.

Similarly, for over-charging protection, the ICs carry out logical decision according to the states of the input terminals and provide outputs, as illustration in the following comparison Table 10 of terminal inputs vs. terminal outputs. When the output from terminal Co1 is in high impedance state, the high impedance state of terminal Co1 is pulled to high level by the pull-up resistor between terminal Co1 and the positive pole of the power supply unit, so as to switch off the exterior PMOSFET:

TABLE 10

| State of IC | Input Signal | | | | | | Output Signal | |
|---|---|---|---|---|---|---|---|---|
| | K | K1 | Exterior_Co | Exterior_Co1 | Dco | Dco1 | Co | Co1 |
| Normal State | 1 | 0 | high impedance state | high impedance state | 1 | 1 | high impedance state | 0 |
| Protection State | 1 | 0 | high impedance state | 0 | 0 | 1 | 0 | high impedance state |
| | 1 | 0 | high impedance state | high impedance state | 1 | 0 | high impedance state | high impedance state |
| | 1 | 0 | high impedance state | 0 | 0 | 0 | 0 | high impedance state |

Wherein, terminal Dco is the Dco terminal of the expansion connection module of the four-cell protection IC, and terminal Dco1 is the Dco terminal of the expansion connection module of the three-cell protection IC.

Since the principle of the over-charge protection circuit is identical to the principle of the over-discharge protection circuit, hereunder the cell protection circuit provided in the embodiments of the present invention will be described in the case of over-discharge protection.

When the voltage of each cell doesn't reach to the voltage rating of over-charge detection, the cell protection circuit is in normal state. In that state, input terminal K is in state "1", terminal Exterior_Do is in float state (i.e., high impedance state), and terminal Ddo is in state "1"; the four-cell protection IC carries out logical decision according to the inputs, and sets the expansion output terminal Do to high impedance state, sets the expansion input terminal Exterior_Do1 to high impedance state, sets terminal K1 to state "0", and sets terminal Ddo1 to state "1"; the three-cell protection IC carries out logical decision according to the inputs, and thereby sets the expansion output terminal Do1 to low level; therefore, the exterior PMOSFET gates on, and the cells can discharge normally.

When the voltage of any cell in the four cells monitored by the IC reaches to the voltage rating of over-charge detection, the cell protection circuit enters into protection state. In that case, input terminal K is in state "1", terminal Exterior_Do is in float state (i.e., high impedance state), terminal Ddo is in state "0", and the four-cell protection IC carries out logical decision according to above inputs, and sets the expansion output terminal Do to state "0", and thereby sets the expansion input terminal Exterior_Do1 to state "0". In addition, if the voltage of each cell in the three cells monitored by the IC doesn't reach to the voltage rating of over-charge detection, terminal K1 is in state "0", terminal Ddo1 is in state "1", and the three-cell protection IC carries out logical decision for the inputs of expansion input terminal Exterior_Do1, terminal K1, and terminal Ddo1, and sets the expansion output terminal Do1 to high level, switch off the exterior PMOSFET, and thereby switch off the discharge circuit of the cell protection circuit, so as to achieve cell protection against over-discharge.

In addition, if the voltage of each cell in the four cells monitored by the four-cell protection IC doesn't reach to the voltage rating of over-charge detection but the voltage of any cell in the three cells monitored by the three-cell protection IC reaches to the voltage rating of over-charge detection, or if the voltage of any cell in the four cells monitored by the four-cell protection IC reaches to the voltage rating of over-charge protection and the voltage of any cell in the three cells monitored by the three-cell protection IC reaches to the voltage rating of over-charge detection, according to the principle of the logical decision described above, expansion input terminal Do1 is at high level, the exterior PMOSFET is switched off, and thereby the discharge circuit of the cell protection circuit is switched off, so as to achieve cell protection against over-discharge.

Figure 6B:
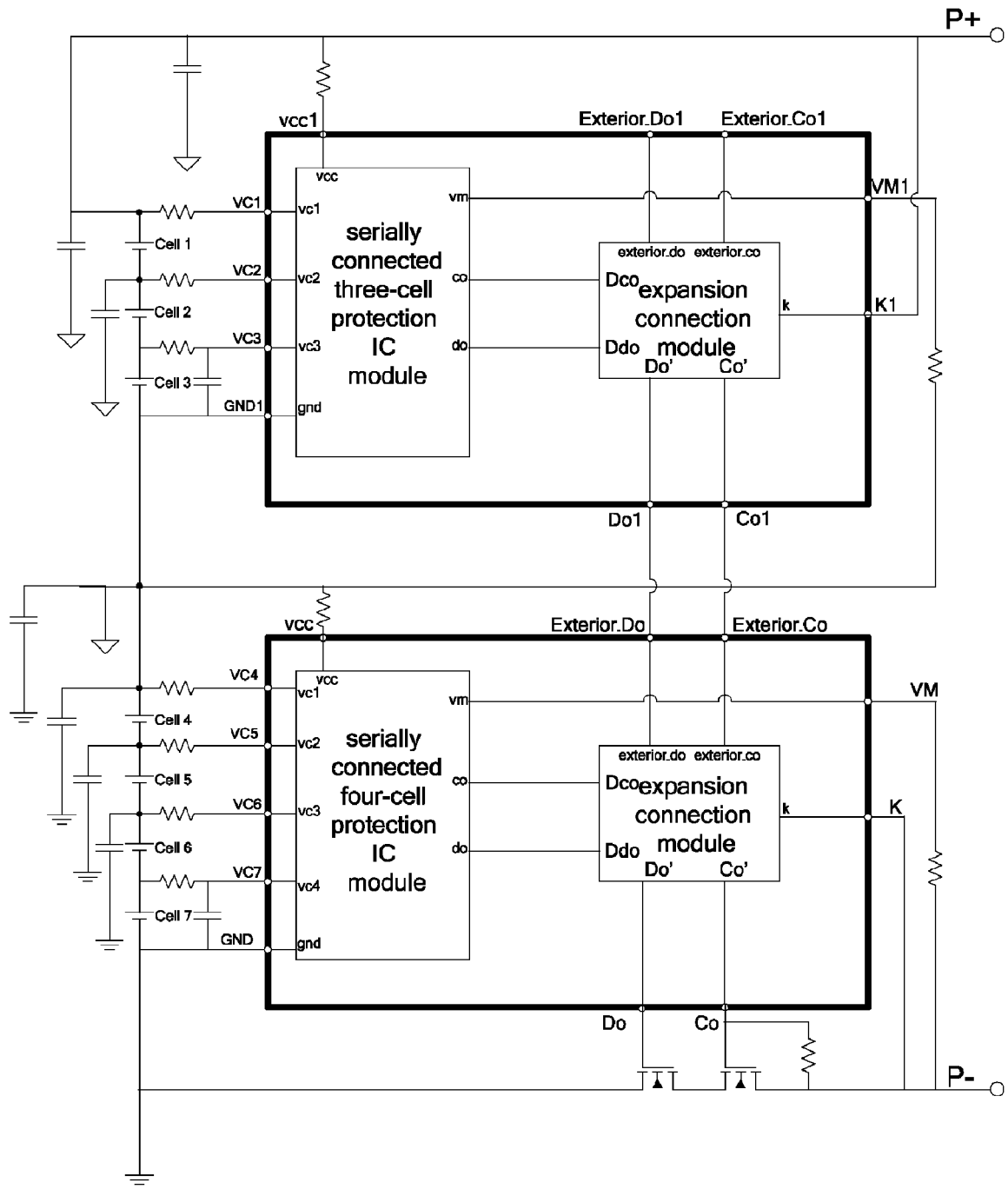
FIG. 6b is a diagram of circuit connection of the integrated circuit for cell protection in downstream signal transmission direction in the embodiments of the present invention.

FIG. 6b shows the expansion connection of the integrated circuit for cell protection in downstream signal transmission direction in the embodiments of the present invention, in which a serially connected four-cell battery protection integrated circuit module is equipped with an IC with an expansion connection module and a serially connected three-cell battery protection integrated circuit module is equipped with a IC with an expansion connection module.

Since the signal transmission direction is downstream direction, the three-cell protection IC is in expanded mode, the expansion selection control terminal K1 is connected to high level, the expansion input terminals Exterior_Do1 and Exterior_Co1 are in float state (i.e., high impedance state), the expansion output terminals Do1 and Co1 are connected to the expansion input terminals Exterior_Do and Exterior_Co of the four-cell protection IC; the connections of the rest pins are identical to the connections of the pins in the case of upstream signal transmission direction. The four-cell protection IC is in non-expanded mode, the expansion selection control terminal K is connected to low level, and the expansion output terminals Do and Co are connected to an NMOSFET that controls the charge/discharge circuit. In addition, pin Co1 is connected to the positive pole of the power supply unit through a resistor, to pull down the high impedance state of pin Co1 to low level. Since the principle of the circuit is identical to the principle of the circuit in upstream transmission mode, it will not be further detailed here.

It is understood that different ICs with the expansion connection module described above can be chosen as required in actual applications, so as to achieve protection of any number of cells connected serially.

In the embodiments of the present invention, a multi-cell protection IC is formed by fitting an expansion connection module to each serially connected multi-cell battery protection integrated circuit module; a plurality of such multi-cell protection ICs are connected to form an integrated circuit for cell protection. Each cell protection IC carries out logical operations for the interior input signals, expansion input signals, and expansion selection control signal; finally, the ON/OFF state of the exterior MOSFET is controlled by the expansion output of the topmost multi-cell protection IC or the bottommost multi-cell protection IC in the integrated circuit for cell protection, so that the ON/OFF state of the charge/discharge circuit of the cells is controlled, and thereby the protection of any number of cells is achieved.

While the present invention has been illustrated and described with reference to some preferred embodiments, the present invention is not limited to these. Those skilled in the art should recognize that various variations and modifications can be made without departing from the spirit and scope of the present invention as defined by the accompanying claims.

What is claimed is:

1. A multi-cell protection circuit, comprises:
a first multi-cell protection chip and a second multi-cell protection chip, wherein each multi-cell protection chip comprises a serially connected multi-cell battery protection integrated circuit module and an expansion connection module, and input terminals of the serially connected multi-cell battery protection integrated circuit module are connected to positive and negative poles of corresponding cells, and output terminals of the serially connected multi-cell battery protection integrated circuit module are connected to interior signal input terminals of the expansion connection module;
a charge control switch and a discharge control switch, wherein:
expansion signal input terminals of the expansion connection module in the first multi-cell protection chip are connected to corresponding expansion signal output terminals of the expansion connection module in the second multi-cell protection chip, thereby the two multi-cell protection chips are connected together, and
expansion signal output terminals of the expansion connection module in the first multi-cell protection chip are connected to the charge control switch and the discharge control switch, respectively,
the second multi-cell protection chip is configured to make a second logical decision based on a status of the cells associated with the second multi-cell protection chip and export the second logical decision to the first multi-cell protection chip through the expansion signal output terminals of the expansion connection module in the second multi-cell protection chip,
the first multi-cell protection chip is configured to make a first logical decision based on a status of the cells associated with the first multi-cell protection chip and the second logical decision from the second multi-cell protection chip received through the expansion signal input terminals of the expansion connection module in the first multi-cell protection chip, and control operations of the charge control switch and the discharge control switch, respectively, in accordance with the first logical decision,
wherein the expansion connection module of the first multi-cell protection chip further comprises:
an expansion signal processing module, configured to convert the expansion output signals of the second multi-cell protection chip to expansion input signals that can be identified by the first multi-cell protection chip;
an expansion selection control signal processing module, configured to convert the expansion selection control signal of the first multi-cell protection chip into an expansion selection control signal that can be identified by the first multi-cell protection chip;
a logical processing module, configured to carry out the logical decision for the interior input signals, the expansion input signals, and the expansion selection control signals; and
an output stage module, configured to output an expansion output signal according to the logical decision result of the logical processing module.

2. The multi-cell protection circuit according to claim 1, wherein the expansion signal processing module comprises:
an expansion charge signal processing module, configured to convert the expansion charge output signal of the second multi-cell protection chip to an expansion charge input signal that can be identified by the first multi-cell protection chip; and
an expansion discharge signal processing module, configured to convert the expansion discharge output signal of the second multi-cell protection chip to an expansion discharge input signal that can be identified by the first multi-cell protection chip.

3. The multi-cell protection circuit according to claim 1, wherein the first and second multi-cell protection chips are connected through their expansion connection modules in upstream or downstream signal transmission direction; in case of upstream signal transmission direction, the charge control switch and discharge control switch employ PMOSFETs and is connected with the first multi-cell protection chip; in case of downstream signal transmission direction, the charge control switch and discharge control switch employ NMOSFETs, and is connected with the second multi-cell protection chip.

4. The multi-cell protection circuit according to claim 3, wherein if the first and second multi-cell protection chips are connected through their expansion connection modules in upstream signal transmission direction:
the expansion signal processing module pulls up the high impedance state of the expansion output signal of the second multi-cell protection chip to high level by means of a pull-up resistor and a level shifting device;
the logical processing module carries out the logical decision for the interior input signals, the expansion output signals, and the expansion selection control signal with NAND gate or AND gate by selecting path with a path selector composed of transfer gates.

5. The multi-cell protection circuit according to claim 3, wherein if the first and second multi-cell protection chips are connected through their expanded connection modules in downstream signal transmission direction:
the expansion signal processing module pulls down the high impedance state of the expansion output signal of the second multi-cell protection chip to low level by means of a pull-down resistor and a level shifting device;
the logical processing module carries out the logical decision for the interior input signals, the expansion output signals, and the expansion selection control signal with NAND gate or AND gate by selecting path with a path selector composed of transfer gates.

6. The multi-cell protection circuit according to claim 3, wherein if the first and second multi-cell protection chips are connected through their expanded connection modules in upstream signal transmission direction:
the expansion signal processing module pulls up the high impedance state of the expansion output signal of the second multi-cell protection chip to high level by means of a pull-up resistor and a level shifting device;
the logical processing module carries out the logical decision for the interior input signals, the expansion output signals, and the expansion selection control signal with NOR gate or OR gate by selecting path with a path selector composed of MOSFETs.

7. The multi-cell protection circuit according to claim 3, wherein if the first and second multi-cell protection chips are connected through their expanded connection modules in downstream signal transmission direction:

the expansion signal processing module pulls down the high impedance state of the expansion output signal of the second multi-cell protection chip to low level by means of a pull-down resistor and a level shifting device;

the logical processing module carries out the logical decision for the interior input signals, the expansion output signals, and the expansion selection control signal with NOR gate or OR gate by selecting path with a path selector composed of MOSFETs.

8. The multi-cell protection circuit according to claim 3, wherein if the first and second multi-cell protection chips are connected through their expanded connection modules in upstream signal transmission direction:

the expansion selection control signal processing module comprises a first input terminal and a second input terminal; the first input terminal of the second multi-cell protection chip is connected to high level or in float state, and the first input terminal of the first multi-cell protection chip are connected to low level; the second input terminal of the first multi-cell protection chip is connected to high level or in float state, and the second input terminal of the second multi-cell protection chip are connected to low level;

the expansion signal processing module pulls up the high impedance state of the expansion output signal of the second multi-cell protection chip to high level by means of a pull-up resistor and a level shifting device;

the logical processing module carries out the logical decision for the interior input signals, the expansion output signals, and the expansion selection control signal with NAND gate or AND gate.

9. The multi-cell protection circuit according to claim 3, wherein if the first and second multi-cell protection chips are connected through their expanded connection modules in downstream signal transmission direction:

the expansion selection control signal processing module comprises a first input terminal and a second input terminal; the first input terminal of the first multi-cell protection chip is connected to high level or in float state, and the first input terminal of the second multi-cell protection chip are connected to low level; the second input terminal of the second multi-cell protection chip is connected to high level or in float state, and the second input terminal of the first multi-cell protection chip are connected to low level;

the expansion signal processing module pulls down the high impedance state of the expansion output signal of the second multi-cell protection chip to low level by means of a pull-down resistor and a level shifting device;

the logical processing module carries out the logical decision for the interior input signals, the expansion output signals, and the expansion selection control signals with NAND gate or AND gate.

10. A method for protecting a multi-cell battery using a first multi-cell protection chip and a second multi-cell protection chip, wherein each multi-cell protection chip comprises a serially connected multi-cell battery protection integrated circuit module and an expansion connection module, and input terminals of the serially connected multi-cell battery protection integrated circuit module are connected to positive and negative poles of corresponding cells, and output terminals of the serially connected multi-cell battery protection integrated circuit module are connected to interior signal input terminals of the expansion connection module, comprises the following steps:

each multi-cell protection chip generating interior output signals that indicate the cell state, according to the state of the cell monitored by the protection chip;

the second multi-cell protection chip carrying out a second logical decision based on a status of the cells associated with the second multi-cell protection chip and exporting the second logical decision to the first multi-cell protection chip;

the first multi-cell protection chip carrying out a first logical decision based on a status of the cells associated with the first multi-cell protection chip and the second logical decision from the second multi-cell protection chip; and the first multi-cell protection chip controlling ON/OFF state of the cell charge/discharge circuit, according to the first logical decision of the first multi-cell protection chip, wherein the first multi-cell protection chip is further configured to:

convert expansion output signals of the second multi-cell protection chip to expansion input signals that can be identified by the first multi-cell protection chip;

convert expansion selection control signal of the first multi-cell protection chip into an expansion selection control signal that can be identified by the first multi-cell protection chip;

carry out the first logical decision for the interior input signals, the expansion input signals, and the expansion selection control signals; and output an expansion output signal for controlling the ON/OFF state of the cell charge/discharge circuit.

11. A multi-cell protection circuit, comprises one or more multi-cell protection chips, a charge control switch and a discharge control switch, wherein each multi-cell protection chip comprises a serially connected multi-cell battery protection integrated circuit module and an expansion connection module; the input terminals of the serially connected multi-cell battery protection integrated circuit module are used to connect to the positive and negative poles of corresponding cells, and the output terminals are connected to the interior signal input terminals of the expansion connection module; the expansion signal input terminals of the expansion connection module are connected to expansion signal output terminals of an expansion connection module in a multi-cell protection chip adjacent to this multi-cell protection chip, thereby the multi-cell protection chips connect together, and the expansion signal output terminals of the expansion connection module in the last connected multi-cell protection chip among the connected multi-cell protection chips are connected to the charge control switch and the discharge control switch, respectively, wherein the expansion connection module comprises: an expansion signal processing module, configured to convert the expansion output signals of the adjacent multi-cell protection chip to expansion input signals that can be identified by the multi-cell protection chip; an expansion selection control signal processing module, configured to convert the expansion selection control signal of the multi-cell protection chip into an expansion selection control signal that can be identified by the multi-cell protection chip; a logical processing module, configured to carry out logical operation for the interior input signals, the expansion input signals, and the expansion selection control signals; and an output stage module, configured to output an expansion output signal according to the logical operation result of the logical processing module, wherein the multi-cell protection chips are connected through their expansion connection modules in upstream or downstream signal transmission direction; in case of upstream signal transmission direction, the charge control switch and discharge control switch employ PMOSFETs and is connected with the uppermost multi-cell protection chip; in case of downstream signal transmission direction, the charge control switch and discharge control switch employ NMOSFETs, and is connected with the bottommost multi-cell protection chip, wherein if the multi-cell protection chips are connected through their expanded connection modules in upstream signal transmission direction:

the expansion selection control signal processing module comprises a first input terminal and a second input terminal; the first input terminal of the bottommost multi-cell protection chip is connected to high level or in float state, and the first input terminals of the other multi-cell protection chips are connected to low level; the second input terminal of the topmost multi-cell protection chip is connected to high level or in float state, and the second input terminals of the other multi-cell protection chips are connected to low level;

the expansion signal processing module pulls up the high impedance state of the expansion output signal of the adjacent multi-cell protection chip to high level by means of a pull-up resistor and a level shifting device;

the logical processing module carries out logical operation for the interior input signals, the expansion output signals, and the expansion selection control signal with NAND gate or AND gate.

\* \* \* \* \*